April 22, 1958     G. BRUCK ET AL     2,832,035
TRANSISTOR VOLTAGE OR CURRENT REGULATOR
Filed June 14, 1956
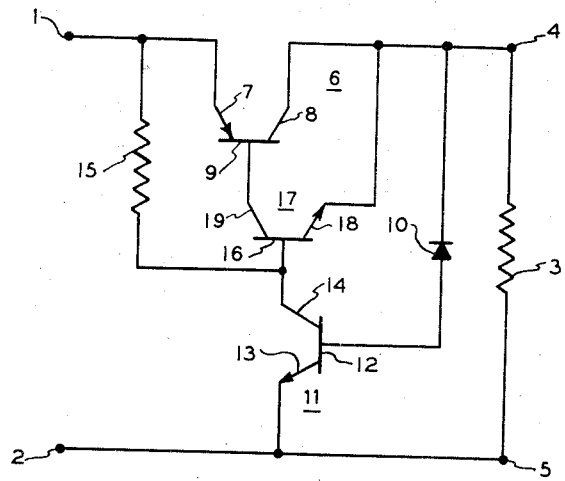
INVENTORS
George Bruck
Joseph J. Lamplot
William R. Harten
BY
ATTORNEY United States Patent Office 2,832,035
Patented Apr. 22, 1958

2,832,035
TRANSISTOR VOLTAGE OR CURRENT REGULATOR

George Bruck, Joseph J. Lamplot, and William R. Harter, Cincinnati, Ohio, assignors to Avco Manufacturing Corporation, Cincinnati, Ohio, a corporation of Delaware Application June 14, 1956, Serial No. 591,499

2 Claims. (Cl. 323—22)

The present invention relates generally to transistorized voltage and current regulating systems and more particularly to a system for maintaining constant the voltage across a load or current flow in a load by varying the impedance of a transistor in series with the load, in response to load voltage variations, in such sense as to compensate for the load voltage variations.

Briefly describing a preferred embodiment of the invention, a PNP transistor is connected with its emitter to a source terminal and its collector to a load terminal, so that its internal resistance from emitter to collector may be in series with a load. The base of the series transistor is connected to the collector of a further or intermediate transistor (hereinafter referred to as a second control transistor, for reasons which will become apparent as the description proceeds), which controls base current and thereby internal impedance of the series transistor, or current flow from emitter to collector thereof.

The voltage across the load is compared with the Zener voltage of a Zener diode, which has a relatively low dynamic resistance. This is accomplished by connecting the Zener diode in series with the base to emitter circuit of a first NPN control transistor, voltage changes across the Zener diode generating current changes to the base of the transistor. Changes in base current are reflected as $\beta$-fold changes of collector current in the same sense, where $\beta$ is the current gain of the transistor. However, the collector is connected in series with a fixed resistance to the input voltage terminal of the system, so that a change in collector current is reflected as a voltage change of inverse phase at the collector.

The collector of the first transistor is directly connected to the base of a control NPN transistor, having its emitter connected to a load terminal and its collector directly connected to the base of the series regulating transistor.

A change in voltage at the base of the control transistor is reflected as a correspondingly phased change in current into the base. The change in base current corresponds with a corresponding change of collector current, and in turn with a corresponding change of base current of the series regulator transistor. Increase of the base current of the series regulator transistor increases both its collector and emitter current, and since the collector currents correspond with output load current the voltage across the load increases. Decrease of base current of the series regulator transistor has the opposite effect.

Each transistor, since it is fed with signal at its base, provides amplified signal at its collector, so that the effect of cascaded amplification of an error signal is included in the system, and extremely close regulation results. The total series voltage drop in the series regulating transistor 6 is of relatively small value. For example, in one practical embodiment of the invention, wherein input voltage varied between 22 and 30 volts, output voltage was maintained at 13.2 v. Since the system operated by reference to a Zener diode operating as a voltage standard, the output voltage of the system may be independent of transistor characteristics or operating parameters, and the system may correct for variations of load current or input voltage.

While the presently described embodiment of our invention employs a PNP transistor in series with a load, and two NPN control transistors, transistors of opposite conductivity types may be substituted upon reversal of appropriate voltages and polarities of polarized circuit elements.

It is, accordingly, a primary object of the present invention to provide a novel voltage regulator.

It is another object of the present invention to provide a device for regulating the magnitude of an electrical quantity.

A further object of the present invention resides in the provision of a transistorized voltage or current regulator consisting of a Zener diode voltage reference device, three transistors and a single resistance.

Another object of the invention resides in the provision of a system of regulation of an electrical quantity including a regulating transistor having an internal path in series with a load, and in which current flow through the path is controlled in response to carrier injection to the transistor, in response to current flow in a reference Zener diode.

A further object of the invention resides in the provision of a regulator system for current or voltage in which a plurality of transistors are directly coupled in cascade to vary a load current, by controlling the current passed to the load by one of the transistors.

It is another object of the invention to provide a regulation system for voltage or current which operates with negligible delay, by virtue of the exclusion from the system of capacitors and inductances.

A further object of the invention resides in the provision of a transistorized system for regulating current or voltage which provides a regulated output which is independent of circuit parameters, load, and input voltage, over a wide extent of values.

Still another object of the invention resides in the provision of a transistorized system of voltage or current regulation which requires a minimum number of elements, which is susceptible of economical fabrication, and which possesses the virtue of maintaining output values with extreme accuracy.

The above and still further objects, features and advantages of the present invention will become apparent upon consideration of the following detailed description of one specific embodiment thereof, especially when taken in conjunction with the accompanying drawings, wherein the single figure of the accompanying drawings is a schematic circuit diagram of a system in accordance with the invention.

Referring now more particularly to the accompanying drawings, the reference numerals 1, 2 denote the voltage input terminals of a voltage regulator system arranged in accordance with the invention. A resistive load 3 is connected between output terminals 4, 5, the terminal 5 being directly connected with the terminal 2. In series between the terminals 1 and 4 is connected the emitter-collector circuit of a PNP transistor 6, having an emitter 7, a collector 8 and a base 9. More specifically the emitter 7 is connected to the terminal 1 and the collector 8 to the terminal 4. The difference in potential between points 1 and 4 is then determined, from one point of view, by the internal voltage drop between emitter 7 and collector 8, which is in turn controlled, by the current into base 9. From another point of view current flow to base 9 controls current flow into emitter 7 and out of collector 8, and hence current to the load.

Connected in parallel with the load 3 is a Zener diode 10, and the base to emitter circuit of an NPN transistor 11. The Zener diode 10 operates essentially as a voltage reference device, and consists of a silicon-aluminum rectifier connected in reverse or non-conducting direction, operated over a range of its operating characteristic which is commonly known as the Zener range, and wherein voltage across the diode remains constant over a considerable range of current values. To be particularly useful in the present application it is desirable to utilize a Zener diode having a low dynamic impedance, a suitable value being of the order of 10 ohms. It follows that a small change in voltage across the Zener diode causes a large change in current through the diode.

Identifying the base, emitter and collector electrodes of transistor 11 by the reference numerals 12, 13 and 14, respectively, if the voltage across load 3 drops, for any reason, the current through the Zener diode 10 drops proportionately, a small drop of voltage resulting in a relatively large drop in current. This current flows into the base 12 of transistor 11, and decreases the flow of current into collector 14, and increases the collector voltage, since the load on transistor 11 is reasonably constant.

Connected in circuit between terminal 1 and the collector 14 of transistor 11 is a resistance 15. The base 16 of a transistor 17 is connected directly to the collector 14, and has an emitter 18 which is directly connected to the terminal 4 as well as a collector 19 which is connected directly to the base 9 of transistor 6.

When the voltage at collector 14 increases the curernt into the base 16 of transistor 17 increases, which increases both collector and emitter current of transistor 17. Since the collector current of transistor 17 is the same as the base current of transistor 6 the emitter and collector current of transistor 6 are increased, in response to the increase of base current, and the output voltage at terminal 4 increases.

If the output voltage at terminal 4 increases for any reason current through the Zener diode 10 increases, which establishes a β-fold increase of collector current in the transistor 11, β being the current amplification factor of the transistor. Increase of collector current decreases the voltage on the collector, due to the relatively fixed load thereon, and current to the base 16 of transistor 17 decreases. This decrease of collector current corresponds with a decrease of base current out of base 9 of transistor 6, decreasing the collector and emitter current of the latter, and thereby decreasing the voltage across the load 3.

It is important to note that the regulator of the present invention consists of three transistors, a Zener diode and a resistor, and includes no capacitors or inductors. Response may therefore be extremely rapid. The transistors 11, 17, 6 may be, in the recited order, of successively greater power handling capabilities, the transistor 6 being required to handle the total load current, the transistor 11 a small control current and the transistor 17 sufficient current to supply the high rating transistor 6. This system is extremely sensitive since the error signal is thrice amplified, by transistors 11, 17, and 6. Moreover, the Zener diode 10, if selected to have a low dynamic resistance contributes to the sensitivity of the system by providing a large current change at the base 12 of transistor 11 in response to a relatively small voltage change. Zener diodes having dynamic resistance of the order of 10 ohms or less are available.

The system of the invention may be employed as a current or voltage regulating system. The system operates inherently to control voltage across a load, since control is effected in response to comparison with a voltage reference device, i. e. a Zener diode. However, for constant load resistance the system serves to control current flow to the resistance, since in such case current and voltage are directly proportional, one to the other.

It is also feasible to connect a resistance in series with a voltage source, between terminals 1 and 2. In such case, if resistance 3 is assumed constant the total current delivered by the voltage source is constant, since current drain in parallel with the load is negligible. Thereby, the system becomes a current regulator. The above suggested modifications, and modes of utilization of systems in accordance with the present invention, as well as others, will readily suggest themselves to those skilled in the art appertaining to voltage and current regulators.

Transistor types which have been employed in a practical embodiment of the present system are as follows:

| Reference numeral: | Transistor type |
| --- | --- |
| 9 | H-2 |
| 11 | X-15 |
| 17 | GT-732 |

While we have described and illustrated one specific embodiment of our invention, it will be clear that variations of the general arrangement and of the details of construction which are specifically illustrated and described may be resorted to without departing from the true spirit and scope of the invention as defined in the appended claims.

What we claim is:

1. In a current or voltage regulator, a pair of input terminals, a pair of output terminals for connection to a load, a first of each pair of said input and output terminals being connected commonly to a point of reference potential, a first semi-conductor device of PNP type and having a first emitter, collector and base, a second semi-conductor device of NPN type and having a second emitter, collector and base, a third semi-conductor device of NPN type and having a third emitter, collector and base, a Zener diode, means connecting said Zener diode between the second output terminal and the second base, means connecting the second emitter to said point of reference potential, a resistor connected between said second input terminal and the second collector, means connecting the third base directly to the second collector, means connecting the third emitter directly to the second output terminal, means connecting the third collector directly to the first base, means connecting the first emitter to one of said second terminals, and means for connecting the first collector to the other of said second terminals.

2. A voltage or current regulator having input terminals and output terminals, a series regulating transistor of one conductivity type, said series regulating transistor having a first base, emitter and collector, said emitter and collector being in series between one of said input and one of said output terminals, a direct connection between the remaining input and output terminals, a Zener diode, a first control transistor having a second base, emitter and collector, means connecting said Zener diode in series with the base-to-emitter circuit of said first control transistor across said output terminals, a resistance load connected between the collector of said control transistor and said one input terminal, a second control transistor having a third base, emitter and collector, means directly connecting said third base to said second collector, means directly connecting said third emitter to said one output terminal, means directly connecting said second emitter to the other output terminal, and means directly connecting said first base to said third collector, said control transistors being of a conductivity type opposite to said one conductivity type.

References Cited in the file of this patent

UNITED STATES PATENTS

| 2,693,568 | Chase | Nov. 2, 1954 |
| 2,751,549 | Chase | June 19, 1956 |
| 2,751,550 | Chase | June 19, 1956 |